(No Model.) 2 Sheets—Sheet 1.

R. EICKEMEYER, Dec'd.
R. EICKEMEYER, JR., Executor.
DIFFERENTIAL GEAR.

No. 575,880. Patented Jan. 26, 1897.

Witnesses
J. G. Hinkel
Ann N. Dobson

Inventor
Rudolf Eickemeyer
By Foster Freeman
Attorneys (No Model.) 2 Sheets—Sheet 2.

R. EICKEMEYER, Dec'd.
R. EICKEMEYER, JR., Executor.
DIFFERENTIAL GEAR.

No. 575,880. Patented Jan. 26, 1897.

Witnesses
J. G. Hinkel
Alec N. Dobson

Inventor
Rudolf Eickemeyer
By Foster Freeman
Attorneys

THE NORRIS PETERS CO., PHOTO-LITHO., WASHINGTON, D. C.

UNITED STATES PATENT OFFICE.

RUDOLF EICKEMEYER, OF YONKERS, NEW YORK; RUDOLF EICKEMEYER, JR., EXECUTOR OF RUDOLF EICKEMEYER, DECEASED.

DIFFERENTIAL GEAR.

SPECIFICATION forming part of Letters Patent No. 575,880, dated January 26, 1897.

Application filed September 10, 1894. Serial No. 522,599. (No model.)

*To all whom it may concern:*

Be it known that I, RUDOLF EICKEMEYER, a citizen of the United States, residing at Yonkers, in the county of Westchester and State of New York, have invented certain new and useful Improvements in Differential Gears, of which the following is a specification.

My invention relates to differential gears; and it has for its object to provide a simple and practicable gear of this class in which there is a connection between a driving-shaft and a driven shaft of such a kind that the driven shaft at the will of the operator may be made to run either in one direction or the opposite direction with equal speed, or to remain stationary, while the driving-shaft is continuously running in one direction, and the higher speed of the driving-shaft is reduced to a lower speed in the driven shaft when rotating at a given ratio, depending upon the details of construction and arrangement of parts.

It is further an object of my invention to provide means that will prevent noise and at the same time furnish the most effective lubrication to the parts and to these ends my invention consists in the various features of construction and arrangement of parts having the mode of operation substantially as hereinafter more particularly pointed out.

Referring to the accompanying drawings, I have illustrated one preferred embodiment of my invention, sufficient to explain the principles thereof and enable those skilled in the art to make and use the invention, and it will be understood that the details of construction and arrangement of parts may be varied to suit the exigencies of any particular case, and that parts of my invention may be used separately or in combination, or in combination with other equivalent parts, without departing from the spirit of my invention.

Figure 1:
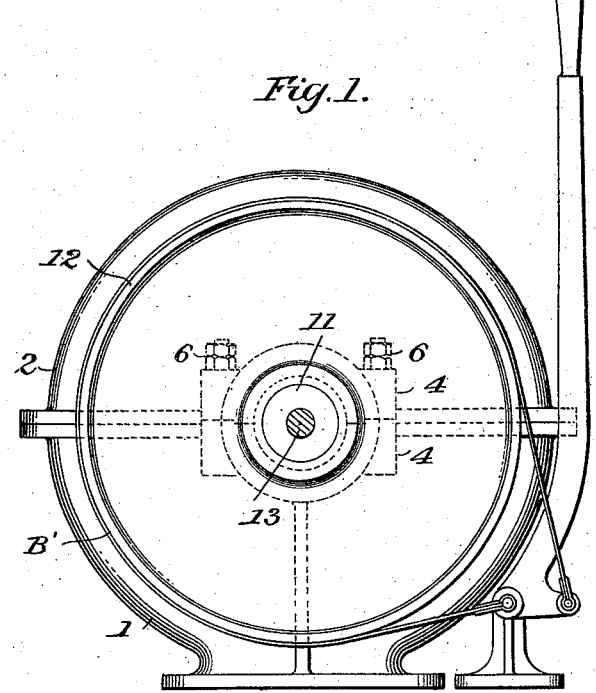
Figure 3:
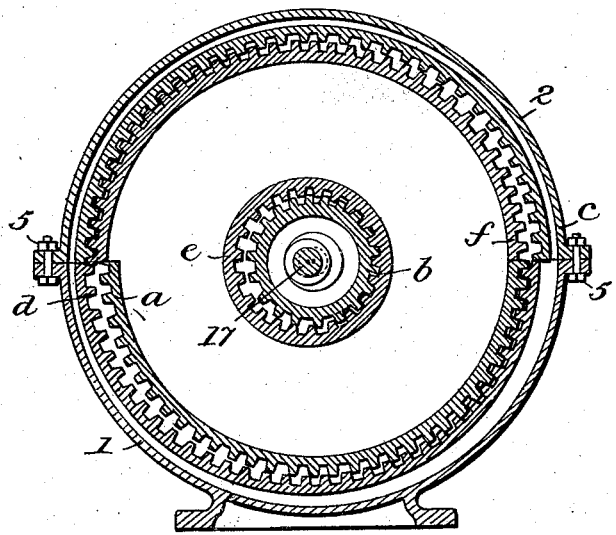
Figure 2:
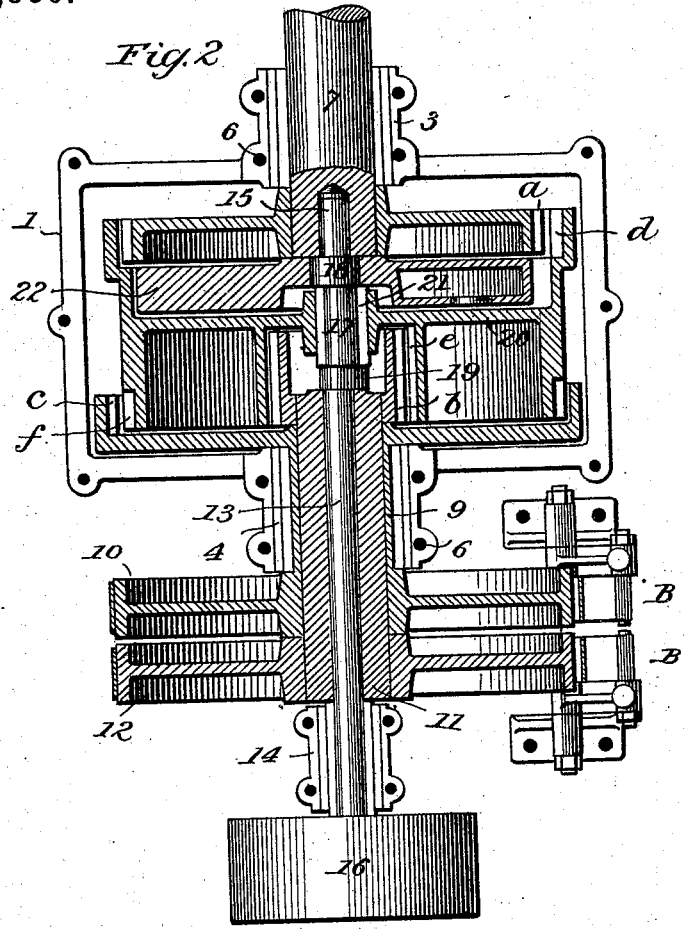
Figure 4:
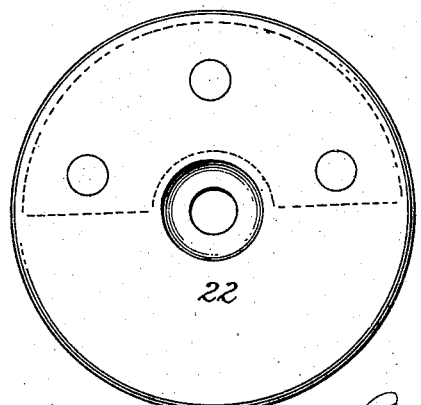

In the drawings, Figure 1 is an end view of the gear, showing the brake apparatus and the driven shaft or pulley. Fig. 2 is a horizontal longitudinal section through the same. Fig. 3 is what may be termed a "sectional diagrammatic view," showing the relations of the different coöperating gears; and Fig. 4 is a side view of the balance-weight.

I will now proceed to describe the specific construction and arrangement of parts illustrated in the accompanying drawings as disclosing a typical and practicable form or embodiment of my invention.

The whole gear-train is inclosed in a substantial casing or housing which is adapted to contain a large supply of lubricating-oil, so that the gears may practically "run in oil," as it is termed in practice, and thereby be perfectly lubricated and be practically noiseless. This housing may be variously constructed, but is shown in the present instance as composed of two parts, a lower part 1 and an upper part or cover 2. The lower part 1 carries on each side the lower parts of boxes 3 and 4, which are in a line, while the cover 2 in the present instance carries the corresponding box-covers, forming, when the cover is secured to the lower portion, suitable boxes for the support of the shafts and gears hereinafter set forth. The cover may be secured by any suitable means, as the bolts 5 and studs 6. The driven shaft 7 is in this instance journaled in the box 3 and carries on its inner end a driven gear $a$, it being shown in the form of an external spur-gear. In the box 4 there is journaled a hollow shaft 9, which serves to connect the stationary gear $c$, which is shown in the form of a flanged wheel having an internal spur-gear, with the brake-wheel 10. The shaft and gear and brake-wheel are shown in the drawings as forming one casting, which is the preferable construction, although, of course, they may be arranged otherwise.

The hollow shaft 9 forms the journal for another hollow shaft 11, which connects the stationary pinion $b$ (shown as having an external spur-gear) with the brake-wheel 12, both being fast or secured to the hollow shaft.

The gear $c$ and pinion $b$, above referred to, are called "stationary" not because they are absolutely so, but because they are stationary while being used, whereas they move when not in use, as will hereinafter be pointed out.

The hollow shaft 11 in turn forms a journal for the central driving-shaft 13, which is in line with the driven shaft 7. The driving-shaft also preferably has bearings in the pillow-block 14 and in a recess or hole 15 in the end of the driven shaft 7. This shaft 13 carries at one end the driving-pulley 16 or other means for rotating the shaft, and near the other end it is shaped into an eccentric or crank 17, and on either side of the crank are arranged the collars 18 and 19. A compound gear-wheel 20 is mounted loosely on the crank 17 by means of a split bushing 21, the halves of which are made fast to the gear-piece after the latter has been slipped over the same, and in order to allow this the collar 19 is made concentric with the crank 17 and bushing 21, and its diameter is a little smaller than that of the bushing. The compound gear-wheel 20 carries three gears, the one $d$ being an internal gear arranged to coöperate with the external gear $a$ on the driven shaft, another being the small internal gear $e$, arranged to coöperate with the external pinion $b$, and the third being the external gear $f$, which is arranged to coöperate with the internal gear $c$. The gears $d$ and $f$ are shown in the form of a toothed rim or flange of the compound gear-wheel. These three gears $d$, $e$, and $f$ are concentric with the crank, and their coöperating gears $a$, $b$, and $c$ are concentric with both the driving and the driven shafts. The pitch is the same in all the gears, and the difference of the number of teeth in each pair is the same, that is, $d-a=c-f=e-b$. In the construction illustrated I have shown these various gears as having a certain number of teeth. Thus $d$ has sixty-six internal teeth; $a$, sixty-four external teeth; $c$ has sixty-eight external teeth; $f$, sixty-six internal teeth; $e$ has twenty-two internal teeth, and $b$ has twenty external teeth.

In order to insure the smooth running of the gear under all conditions, I provide a balance-weight 22, which is mounted upon the collar 18, which is concentric with the driven shaft, and the heavy part of the balance-weight is opposite the crank, thereby exactly balancing all the weight carried by the crank. In order to reduce to a minimum any resistance which the oil in the housing or casing might offer to its rotation, the balance-weight in the present instance has been given the shape of a smooth disk, one half of it, as $22^a$, being cast hollow. There are, as before described, two brake-wheels upon different concentric shafts, and these are arranged outside of the housing and are each provided with some suitable braking device B B', a band-brake being shown in the drawings, operated by the usual lever.

The above description, with reference to the drawings, sets forth the preferred construction of the reversible gear sufficiently to enable it to be understood, and I will now proceed to describe the mode of operation of the device, so that the results and advantages of the use of this invention will be appreciated by those skilled in the art without the necessity of setting them forth in detail. This explanation of the operation is based on the specific construction illustrated, and of course it would vary in detail, but not in principle, in other constructions or embodiments of the invention.

We will suppose that the driving-shaft 13 is driven by the pulley 16 or otherwise, so that it rotates to the right or clockwise, and for convenience of description let us suppose in the first instance that the compound gear-wheel 20 is split, so that the gear $d$ may be able to move independently of the two gears $e$ and $f$, which are also part of the compound gear-wheel and mark their original position. Then the gear $d$, with its sixty-six teeth, would move clockwise around the gear $a$ with its sixty-four teeth, which gear $a$ would be standing still. In running around once gear $d$ would engage with all the sixty-four teeth of the gear $a$, and therefore it is apparent that gear $d$ would advance in the direction of its running, that is, turn clockwise or to the right around the eccentric or crank 17, to the amount of two teeth, (66−64.) Suppose now that the brake B be applied to the brake-wheel 10 so that it and the internal gear $c$, with its sixty-eight teeth, will be held stationary, the gear $f$, with its sixty-six teeth, will run clockwise around the gear $c$ and engage all its sixty-eight teeth, and therefore gear $f$ will advance contrary to the direction of its running, that is, turn counter-clockwise around the eccentric or crank pin 17 to the amount of two teeth, (68−66.) It will thus be seen that so far the gear $d$ has turned clockwise to the amount of two teeth and gear $f$ has turned in the opposite direction to the amount of two teeth. If it is desired to bring the gear $d$ back to its original position relative to gear $f$, it is necessary to turn it clockwise to the amount of four teeth, that is, two plus two, in which case the gear $a$ will also turn counter-clockwise to the amount of four teeth or four sixty-fourths, equal to one-sixteenth of its circumference. This means that if gears $d$ and $f$ had never been separated one whole clockwise rotation of the driving-shaft would move the gear $a$ to the amount of four teeth or four sixty-fourths, equal to one-sixteenth of its circumference, in the opposite direction. If in the other case we operate the brake B' and hold the brake-wheel 12 stationary, the external gear-pinion $b$, with its twenty teeth, will be stationary, and the internal gear $e$, with twenty-two teeth, will run clockwise around gear $b$ and advance clockwise to the amount of twenty-two minus twenty, equal to two teeth, which is exactly equivalent to six teeth on the gears $d$ or $f$, which have in the present instance exactly three multiplied by twenty-two, equal to sixty-six teeth. Now $f$ would be added to $d$ in clockwise direction to the amount of six minus two, equal to four teeth, and $d$ would have to be moved four teeth in clockwise direction to bring it to the original position, in which case gear $a$ would also move clockwise to the same amount of four teeth—four sixty-fourths, equal to one-sixteenth of its circumference. This means that if the gears $d$ and $c$ had never been separated one whole clockwise rotation of the driving-shaft would move the gear $a$ to the amount of four teeth or four sixty-fourths, equal to one-sixteenth of its circumference in the same direction.

When both brakes are loose, the driven gear and the shaft will not move, and each brake-wheel will rotate in a direction opposite to that in which it caused the driven gears to turn when it was held fast by the brake.

It will thus be seen that by controlling the brake-wheels the driven shaft may be rotated in either direction desired at the same rate of speed, and by releasing the brake-wheels the driving-shaft may continue its rotation without rotating the driven shaft, or, in other words, the driven shaft may stop without stopping the driving-shaft.

In the present instance I have shown an arrangement whereby the speed of the driven shaft is reduced with relation to the speed of the driving-shaft, but it is evident that the same principles would apply to increase the relative speed of the driven shaft if such were necessary. It will be further observed that the construction of the parts is very simple and their arrangement exceedingly compact, and the parts are not liable to get out of order, and the advantages of this construction and its applicability to many and various uses wherein a change of speed between the driving and driven shaft is desired, will be apparent to those skilled in the art.

What I claim is—

1. A reversible differential gear, comprising a driving-shaft, a driven shaft, a gear-wheel concentrically mounted on the driven shaft, a compound gear-wheel eccentrically mounted on the driving-shaft and having three sets of teeth, two gears mounted concentrically with the driving-shaft, and brake devices for such gears, substantially as described.

2. A reversible differential gear, comprising a driving-shaft, and a driven shaft, an external gear concentrically mounted on the driven shaft, a compound gear-wheel eccentrically mounted on the driving-shaft and having two internal gears and one external gear, two gears concentrically mounted with reference to the driving-shaft having, respectively, internal and external gears, and brake devices connected to the said concentric gears, substantially as described.

3. A reversible differential gear, having a driving-shaft, a compound gear-wheel eccentrically mounted on the driving-shaft, the said compound gear-wheel being provided with three separate sets of teeth, a driven shaft having a gear engaging one set of teeth, and two gears respectively engaging the other sets of teeth, and means for holding stationary either of said two gears, substantially as described.

4. A reversible differential-gear device comprising a housing having bearings in its sides, a driven shaft carrying a gear having external teeth, a driving-shaft having a crank, a compound gear-wheel mounted on said crank and having three sets of teeth, shafts concentric with the driving-shaft each carrying a gear, the teeth of each of which engage one of the sets of teeth of the compound gear-wheel, and brake devices connected to said concentric shafts and arranged exterior to the casing, substantially as described.

5. A reversible differential-gear device, comprising a driving-shaft, a driven shaft, an external gear concentrically mounted on the driven shaft, a compound gear-wheel eccentrically mounted on the driving-shaft and having three sets of teeth, and two hollow shafts embracing the driving-shaft and each provided with a brake-wheel and with a gear-wheel, said gears engaging an internal and external set of teeth on the compound gear-wheel, substantially as described.

In testimony whereof I have signed my name to this specification in the presence of two subscribing witnesses.

RUDOLF EICKEMEYER.

Witnesses:
RUDOLF EICKEMEYER, Jr.,
WILLARD H. GARRISON.